Figure 1:
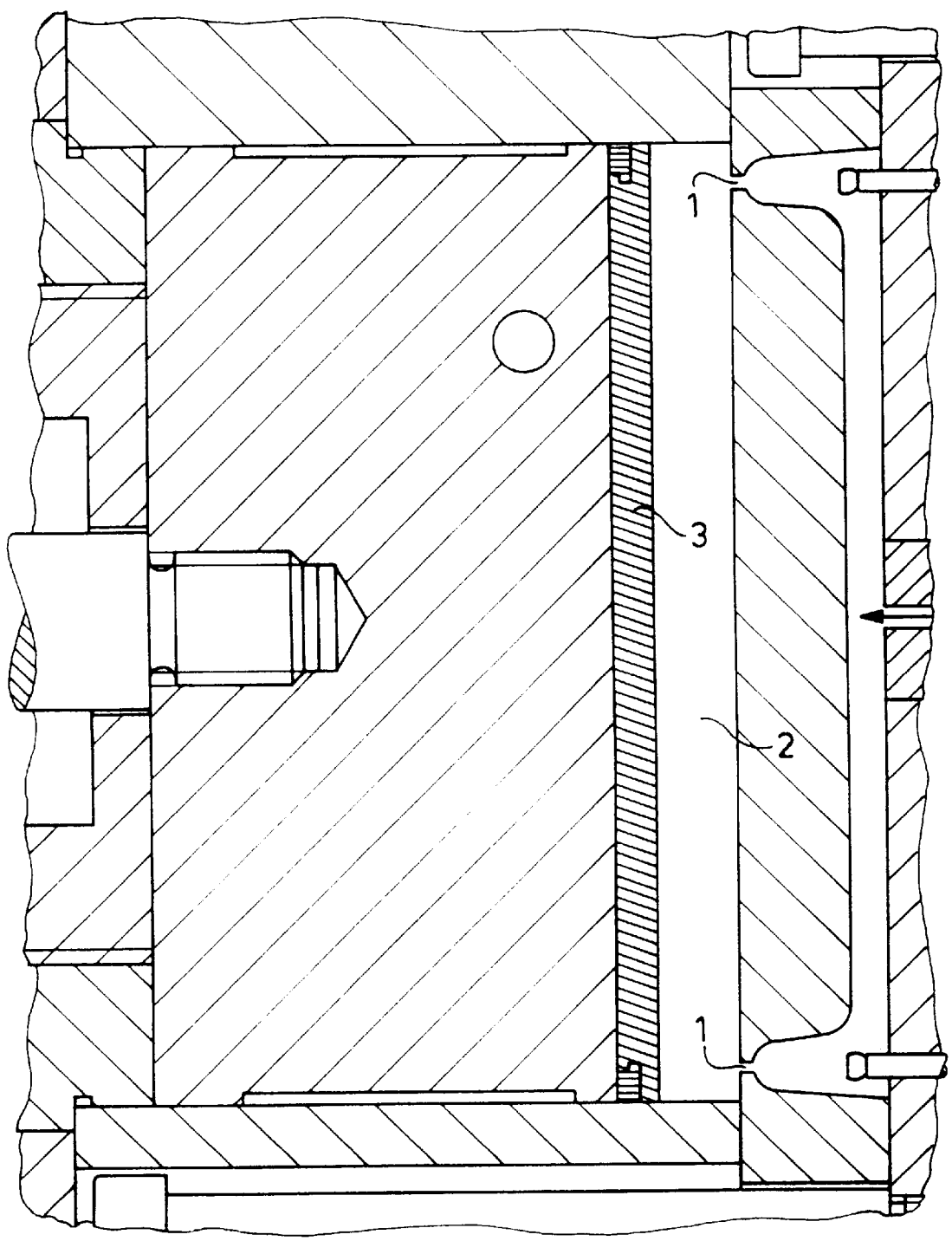

United States Patent [19]

Eckel et al.

[11] Patent Number: 5,994,463
[45] Date of Patent: Nov. 30, 1999

[54] POLYCARBONATE/GRAFT POLYMER MOULDING COMPOSITIONS WITH REDUCED DEPOSIT FORMATION

[75] Inventors: Thomas Eckel, Dormagen; Dieter Wittmann, Leverkusen; Heinrich Alberts, Odenthal; Bahman Sarabi, Krefeld; Herbert Eichenauer; Edgar Leitz, both of Dormagen, all of Germany

[73] Assignee: Bayer Aktiengesellschaft, Germany

[21] Appl. No.: 09/047,598

[22] Filed: Mar. 25, 1998

[30] Foreign Application Priority Data

Apr. 1, 1997 [DE] Germany ............... 197 13 505

[51] Int. Cl.$^6$ .................................................. C08G 63/48
[52] U.S. Cl. .......................... 525/67; 524/115; 524/140; 264/328.1; 264/331.11; 264/331.21
[58] Field of Search .................... 525/67; 524/115, 524/140; 264/328.1, 331.11, 331.21

[56] References Cited

U.S. PATENT DOCUMENTS

| | | | |
|---|---|---|---|
| 4,068,064 | 1/1978 | Platt et al. | 526/194 |
| 4,985,493 | 1/1991 | Eckel et el. | 524/67 |
| 4,988,748 | 1/1991 | Fuhr et al. | 524/141 |
| 5,157,065 | 10/1992 | Fuhr et al. | 524/141 |
| 5,272,193 | 12/1993 | Fuhr er al. | 524/140 |
| 5,302,646 | 4/1994 | Vilasager et el. | 524/127 |
| 5,393,835 | 2/1995 | Eckel et al. | 525/67 |
| 5,393,836 | 2/1995 | Niessner et al. | 525/67 |
| 5,455,302 | 10/1995 | Saito et al. | 525/67 |

FOREIGN PATENT DOCUMENTS 28 42 005  4/1980  Germany.
35 06 472 A1  8/1986  Germany.

OTHER PUBLICATIONS

K. Kirchner and H. Schlapkohl in Makromol. Chem. 177 (1976), pp. 2031–2042.

W. Scholtan et al, Kolloid–Z.u.Z. Polymere 250 (1972), 782–796.

*Primary Examiner*—James J. Seidleck
*Assistant Examiner*—Sanza L. McClendon
*Attorney, Agent, or Firm*—Connolly Bove Lodge & Hutz

[57] ABSTRACT

Thermoplastic polycarbonate/graft polymer moulding compositions containing

A) 5 to 95 parts by weight of an aromatic polycarbonate,
B) 1 to 50 parts by weight of at least one thermoplastic homopolymer, copolymer or terpolymer of styrene, α-methylstyrene, acrylonitrile, N-substituted maleimide or mixtures thereof,
C) 1 to 50 parts by weight of at least one graft polymer of
  C.1) 5 to 90 parts by weight of styrene, α-methylstyrene, acrylonitrile, N-substituted maleimide or mixtures thereof, on
  C.2) 95 to 10 parts by weight of a rubber with a glass transition temperature $\leq 0°$ C. and
D) 1 to 25 parts by weight (per 100 parts by weight A+B+C) of at least one additive selected from flame retardants, lubricants, antistatic agent, mould release agents or mixtures thereof, characterised in that the component B) is produced by bulk, solution or suspension polymerisation and has an oligomer content $\leq 1$ wt. %, component C) is produced by emulsion polymerisation and the total oligomer content of the moulding compositions is $\leq 0.6$ wt. %.

11 Claims, 2 Drawing Sheets

POLYCARBONATE/GRAFT POLYMER MOULDING COMPOSITIONS WITH REDUCED DEPOSIT FORMATION

The present invention relates to thermoplastic polycarbonate/graft polymer moulding compositions with a reduced tendency of the additives to exude out of the thermoplastic composition during processing, and reduced deposit build-up in the mould.

Polycarbonate/graft polymer moulding compositions are multi-phase plastics consisting of I. a thermoplastic polycarbonate II. a thermoplastic copolymer of styrene and acrylonitrile in which the styrene may be completely or partly replaced by other monomers, such as e.g. α-methylstyrene or methyl methacrylate, and III. at least one graft polymer produced by a grafting reaction of one or more of the monomers mentioned in II. on to butadiene homopolymers or copolymers ("graft base"). This graft polymer ("elastomer phase" or "graft rubber") forms the disperse phase in the matrix.

An important point in the production of glossy mouldings from these moulding compositions is the increasing market demand for the absence of deposits in the mould (e.g. the possibility of fully automatic processing of plastics to form mouldings using automatic injection moulding machines) and the certain avoidance of stains or streaks on the mouldings, due to exudation of liquid or low-viscosity components, that is required in high-gloss applications. Similarly, where grained moulds are used, no deposits must solidify in the grain and lead to inadequate grain reproduction on the mouldings. On the other hand, the polycarbonate/graft polymer (especially of the ABS type) moulding compositions must have optimum properties, especially with regard to thermoplastic processability, toughness or flame proofing, and this can often be ensured only by using special additives which, in many cases, are liquid.

The object therefore existed of providing polycarbonate/graft polymer (especially of the ABS type) moulding compositions with very good processing properties without the occurrence of deposit formation during thermoplastic processing.

It has now been found that the requirements described are met if the polycarbonate/graft polymer moulding compositions are made up of certain components and certain boundary conditions are observed.

The invention relates to a thermoplastic polycarbonate/graft polymer moulding composition containing A) 5 to 95 parts by weight, preferably 10 to 90 parts by weight, particularly preferably 20 to 80 parts by weight, of aromatic polycarbonate, B) 1 to 50 parts by weight, preferably 1 to 40 parts by weight and particularly preferably 1 to 30 parts by weight, of at least one thermoplastic homopolymer, copolymer or terpolymer of styrene, α-methylstyrene, acrylonitrile, N-substituted maleimide or mixtures thereof, C) 1 to 50 parts by weight, preferably 2 to 40 parts by weight, of at least one graft polymer of C. 1) 5 to 90 parts by weight, preferably 30 to 80 parts by weight, of styrene, a-methylstyrene, acrylonitrile, N-substituted maleimide or mixtures thereof, on C.2) 95 to 10 parts by weight, preferably 70 to 20 parts by weight, of a rubber with a glass transition temperature $\leq 0°$ C. and D) 1 to 25 parts by weight, preferably 2 to 20 parts by weight and particularly preferably 3 to 15 parts by weight (per 100 parts by weight A+B+C in each case), of at least one additive selected from the group of flame retardants, lubricants, antistatic agents, mould release agents or mixtures thereof, characterised in that the component B) is produced by bulk, solution or suspension polymerisation and has an oligomer content (dimers, trimers, tetramers) $\leq 1$ wt. %, preferably $\leq 0.75$ wt. % and particularly preferably $\leq 0.5$ wt. %, component C) is produced by emulsion polymerisation and the total oligomer content (dimers, trimers, tetramers) of the moulding composition is $\leq 0.6$ wt. %, preferably $\leq 0.4$ wt. % and particularly preferably $\leq 0.3$ wt. %.

Total oligomer content means the oligomer content resulting from components B) and C).

Thermoplastic, aromatic polycarbonates as component A) that are suitable according to the invention are those based on diphenols of formula (I)

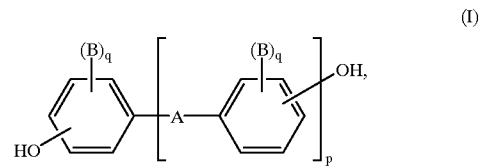

where
A is a single bond, $C_1$–$C_5$ alkylene, $C_2$–$C_5$ alkylidene, $C_5$–$C_6$ cycloalkylidene, —S— or —$SO_2$—,
B is chlorine, bromine
q is 0, 1 or 2 and
p is 1 or 0
or alkyl substituted dihydroxyphenylcycloalkanes of formula (II),

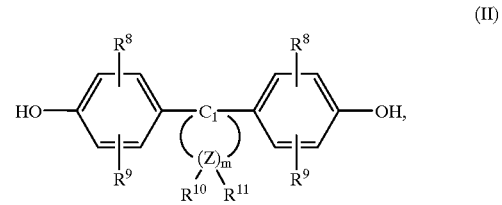

where
$R^8$ and $R^9$, independently of one another, denote hydrogen, halogen, preferably chlorine or bromine, $C_1$–$C_8$ alkyl, $C_5$–$C_6$ cycloalkyl, $C_6$–$C_{10}$ aryl, preferably phenyl, and $C_7$–$C_{12}$ aralkyl, preferably phenyl-$C_1$–$C_4$ alkyl, especially benzyl,
m denotes an integer from 4, 5, 6 or 7, preferably 4 or 5,
$R^{10}$ and $R^{11}$, independently of one another and selectable individually for each Z, denote hydrogen or $C_1$–$C_6$ alkyl and
z denotes carbon, with the proviso that, on at least one Z atom, $R^{10}$ and $R^{11}$ both denote alkyl at the same time.

Suitable diphenols of formula (I) are, e.g., hydroquinone, resorcinol, 4,4-dihydroxy-diphenyl, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dibromo-4-hydroxyphenyl)propane.

Preferred diphenols of formula (I) are 2,2-bis(4-hydroxyphenyl)propane, 2,2-bis(3,5-dichloro-4-hydroxyphenyl)propane and 1,1-bis(4-hydroxyphenyl)-cyclohexane.

Preferred diphenols of formula (II) are 1,1-bis(4-hydroxyphenyl)-3,3-dimethylcyclohexane, 1,1-bis(4- hydroxyphenyl-3,3,5-trimethylcyclohexane and 1,1-bis(4-hydroxyphenyl)-2,4,4-trimethylcyclopentane.

Polycarbonates that are suitable according to the invention are both homopolycarbonates and copolycarbonates.

Component A) may also be a mixture of the thermoplastic polycarbonates defined above.

Polycarbonates may be produced by a known method from diphenols with phosgene by the phase boundary process or with phosgene by the homogeneous phase process, the so-called pyridine process, the molecular weight being adjustable by a known method using an appropriate quantity of known chain terminators.

Suitable chain terminators are, e.g., phenol, p-chlorophenol, p-tert.-butylphenol or 2,4,6-tribromophenol, but also long-chain alkylphenols, such as 4-(1,3-tetramethylbutyl)phenol according to DE-OS 2 842 005 (Le A 19 006) or monoalkylphenol or dialkylphenol with a total of 8 to 20 C atoms in the alkyl substituents according to German Patent Application P 3 506 472.2 (Le A 23 654), such as 3,5-di-tert.-butylphenol, p-iso-octylphenol, p-tert.-octylphenol, p-dodecylphenol and 2-(3,5-dimethylheptyl)phenol and 4-(3,5-dimethyl-heptyl) phenol.

The quantity of chain terminators is generally between 0.5 and 10 mole %, based on the sum of the diphenols of formulae (I) and/or (II) used in each case.

The polycarbonates A) that are suitable according to the invention have average molecular weights ($M_w$, weight average, measured, e.g., by ultracentrifugation or nephelometry) of 10 000 to 200 000, preferably 20 000 to 80 000.

The polycarbonates A) that are suitable according to the invention may be branched by a known method, preferably by incorporating 0.05 to 2 mole %, based on the sum of the diphenols used, of trifunctional or more than trifunctional compounds, e.g. those with three or more than three phenolic groups.

Preferred polycarbonates are, in addition to bisphenol A homopolycarbonate, the copolycarbonates of bisphenol A with up to 15 mole %, based on the molar sums of diphenols, of 2,2-bis(3,5-dibromo-4-hydroxyphenyl)propane and the copolycarbonates of bisphenol A with up to 60 mole %, based on the molar sums of diphenols, of 1,1-bis(4-hydroxyphenyl)-3,3,5-trimethylcyclohexane.

Preferred polycarbonates may also be copolycarbonates with polysiloxane structures.

Polymers B) that are suitable according to the invention are resinous, thermoplastic and rubber-free products of styrene, a-methyl styrene, acrylonitrile, N-substituted maleimide or mixtures thereof with an oligomer content of $\leq 1$ wt. %, preferably $\leq 0.75$ wt. % and particularly preferably $\leq 0.5$ wt. %, produced by bulk, solution or suspension polymerisation and not by emulsion polymerisation.

Preferred polymers are those of styrene/acrylonitrile mixtures, α-methylstyrene/acrylonitrile mixtures, styrene/α-methylstyrene/acrylonitrile mixtures, styrene/N-phenylmaleimide mixtures, styrene/acrylonitrile/N-phenylmaleimide mixtures.

Particularly preferred polymers are styrene/acrylonitrile copolymers and α-methylstyrene/acrylonitrile copolymers.

Polymer resins of this type are known. These resins must be produced in such a way that the required oligomer content is not exceeded. In the process used most often industrially, that of thermal solution or bulk polymerisation, oligomers of preferably 2 to 4 monomer units usually form (cf K. Kirchner and H. Schlapkohl in Makromol. Chem. 177 (1976), pp. 2031–2042: The Formation of Oligomers in the Thermal Copolymerisation of the Styrene/Acrylonitrile System); special reaction conditions (use of certain initiators such as, for example, di-tert.-butyl peroxide, 1,1-bis(tert.-butylperoxy)cyclohexane, benzoyl peroxide or azobisisobutyronitrile) have to be applied in order to avoid such oligomer formation. Processes of this type are known (cf e.g. U.S. Pat. No. 4,068,064).

Consequently, the polymers B) that are suitable according to the invention are preferably produced by bulk, solution or suspension polymerisation using organic radical initiators and maintaining other reaction conditions that may be necessary to achieve the low oligomer contents (cf e.g. U.S. Pat. No. 4,068,064).

In principle, another way of producing the polymers B) that are suitable according to the invention consists in bringing oligomer-containing resins to the required oligomer content by degasification steps (e.g. in the melt); however, this process is relatively costly.

The oligomers may be measured by common methods; the most usual is determination by gas chromatography or by gel permeation chromatography.

The resin components B) preferably possess average molecular weights $M_w$ of 20 000 to 200 000 and intrinsic viscosities [h] of 20 to 110 ml/g (measured in dimethylformamide at 25° C.).

Rubbers suitable for producing the graft polymers C) are especially polybutadiene, butadiene/styrene copolymers, butadiene/acrylonitrile copolymers, polyisoprene or alkyl acrylate rubbers based on $C_1$–$C_8$ alkyl acrylates, especially ethyl, butyl and ethylhexyl acrylate, ethylene/propylene/diene rubbers or silicon rubbers.

The alkyl acrylate rubbers may optionally contain up to 30 wt. % (based on weight of rubber) copolymerised monomers such as vinyl acetate, acrylonitrile, styrene, methyl methacrylate and/or vinyl ether. They may also incorporate smaller quantities, preferably up to 5 wt. % (based on weight of rubber), of ethylenically unsaturated monomers with a cross-linking action. Crosslinking agents are, e.g., alkylenediol diacrylates, alkylenediol dimethacrylates, polyester diacrylates and polyester dimethacrylates, divinylbenzene, trivinylbenzene, triallyl cyanurate, allyl acrylate and allyl methacrylate, butadiene or isoprene.

Acrylate rubbers as the graft base may also contain a crosslinked diene rubber consisting of one or more conjugated dienes, such as polybutadiene, or a copolymer of a conjugated diene with an ethylenically unsaturated monomer, such as styrene and/or acrylonitrile, as the core.

Preferred rubbers for producing the graft polymers C) are diene and alkyl acrylate rubbers. Polybutadiene and copolymers of butadiene and styrene and of butadiene and acrylonitrile are particularly preferred.

The rubbers are present in the graft polymer C) in the form of at least partially crosslinked particles with an average particle diameter of ($d_{50}$) 0.05 to 0.60 μm, preferably of 0.08 to 0.50 μm and particularly preferably 0.1 to 0.45 μm.

The average particle diameter $d_{50}$ is determined by ultracentrifuge measurements according to W. Scholtan et al., Kolloid-Z. u. Z. Polymere 250 (1972), 782–796.

The graft polymers C) are produced by radical emulsion graft polymerisation of the monomers C. 1) in the presence of the rubbers C.2) to be grafted which are in the form of an emulsion.

Flame retardants, lubricants, antistatic agents and mould release agents are suitable as additives D) to be used according to the invention; these additives play an important part in achieving good surface qualities. These additives are used in this application in quantities of 1 to 25 parts by weight, preferably 2 to 20 parts by weight and particularly preferably 3 to 15 parts by weight (based on 100 parts by weight A+B+C in each case).

Examples of flame retardants are both halogen-containing and halogen-free compounds.

Suitable halogen compounds are organic chlorine and/or bromine compounds that are stable during the production and processing of the moulding compositions according to the invention, so that no corrosive gases are released to impair the effectiveness.

Halogen-containing flame retardants are, for example,
1. Chlorinated and brominated diphenyls, such as octachlorodiphenyl, decachlorodiphenyl, octabromodiphenyl, decabromodiphenyl.
2. Chlorinated and brominated diphenyl ethers, such as octa- and decachlorodiphenyl ethers and octa- and decabromodiphenyl ethers.
3. Chlorinated and brominated phthalic anhydride and its derivatives, such as phthalimides and bisphthalimides, e.g. tetrachloro- and tetrabromophthalic anhydride, tetrachloro- and tetrabromophthalimide, N,N'-ethylenebistetrachloro- and N,N'-ethylenebistetrabromophthalimide, N-methyltetrachloro- and N-methyltetrabromophthalimide.
4. Chlorinated and brominated bisphenols, such as 2,2-bis(3,5-dichloro-4-hydroxyphenyl)propane and 2,2-bis(3,5-dibromo-4-hydroxyphenyl)propane.
5. 2,2-bis(3,5-dichloro-4-hydroxyphenyl)propane oligocarbonate and 2,2-bis(3,5-dibromo-4-hydroxyphenyl)propane oligocarbonate with an average degree of polycondensation of 2-20.

Bromine compounds are preferred to chlorine compounds. Halogen-free flame retardants are preferred.

All phosphorus compounds usually used for this purpose, especially phosphine oxides and derivatives of acids of phosphorus and salts of acids and acid derivatives of phosphorus, are preferably suitable as flame retardants.

Derivatives (e.g. esters) of acids of phosphorus and its salts are preferred, acids of phosphorus including phosphoric acid, phosphonic acid, phosphinic acid, phosphorous acid, each also in dehydrated form, salts being preferably alkali, alkaline earth and ammonium salts of these acids, and derivatives (for example partly esterified acids) thereof also being included.

Particularly preferred phosphorus compounds are those of formula (III)

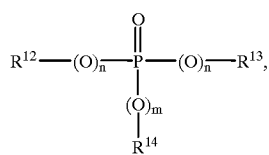

(III)

wherein
$R^{12}$, $R^{13}$ and $R^{14}$, independently of one another, are an optionally halogenated $C_1$–$C_8$ alkyl or an optionally halogenated and/or alkylated $C_5$ or $C_6$ cycloalkyl or an optionally halogenated and/or alkylated and/or aralkylated $C_6$–$C_{30}$ aryl, and n and m, independently of one another, are 0 or 1.

These phosphorus compounds are generally known (cf, for example, Ullmann, Enzyklopädie der technischen Chemie, vol. 18, pages 301 ff., 1979). The aralkylated phosphorus compounds are described, for example, in DE-OS 38 24 356 0.

Optionally halogenated $C_1$–$C_8$ alkyl groups as in compounds of formula (III) and (IV) may be mono- or polyhalogenated, linear or branched. Examples of alkyl groups are chloroethyl, 2-chloropropyl, 2,3-dibromopropyl, butyl, methyl or octyl.

Optionally halogenated and/or alkylated $C_5$ or $C_6$ cycloalkyls as in compounds of formula (III) and/or (IV) are optionally mono- to polyhalogenated and/or alkylated $C_5$ or $C_6$ cycloalkyls, such as e.g. cyclopentyl, cyclohexyl, 3,3,3-trimethylcyclohexyl and fully chlorinated cyclohexyl.

Optionally halogenated and/or alkylated and/or aralkylated $C_6$–$C_{30}$ aryl groups as in compounds of formula (III) are optionally mono- or polynuclear, mono- or polyhalogenated and/or alkylated and/or aralkylated, e.g. chlorophenyl, bromophenyl, pentachlorophenyl, pentabromophenyl, phenyl, cresyl, isopropylphenyl, benzyl-substituted phenyl and naphthyl.

Phosphorus compounds of formula (III) that may be used according to the invention are, e.g., tributyl phosphate, tris(2-chloroethyl) phosphate, tris(2,3-dibromopropyl) phosphate, triphenyl phosphate, tricresyl phosphate, diphenylcresyl phosphate, diphenyloctyl phosphate, diphenyl-2-ethylcresyl phosphate, tri(isopropylphenyl) phosphate, tris (p-benzylphenyl) phosphate, triphenylphosphine oxide, methanephosphonic acid dimethyl ester, methanephosphonic acid dipentyl ester and phenylphosphonic acid diethyl ester.

Other suitable flame retardants are oligomeric phosphorus compounds of formula (IV). The molecular weight of the phosphorus compounds of formula (IV) is generally lower than 2000 g/mol, preferably lower than 1000 g/mol. These are described, for example, in EP-A 0 363 608.

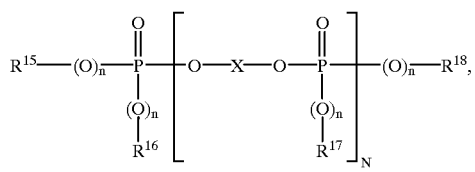

(IV)

where
$R^{15}$, $R^{16}$, $R^{17}$, $R^{18}$, independently of one another, denote $C_1$–$C_8$ alkyl, preferably methyl, $C_5$–$C_6$ cycloalkyl, $C_6$–$C_{10}$ aryl, preferably phenyl, $C_7$–$C_{12}$ aralkyl, preferably phenyl $C_1$–$C_4$ alkyl,
n denotes, independently, 0 or 1
N denotes 1 to 5 and
X denotes a mono- or polynuclear aromatic group with 6 to 30 C atoms; preferably derived from phenyl, bisphenol A, hydrochinon or resorcinol.

In the case of mixtures of several phosphates of formula (IV), N represents an average value between 1 and 5.

Mixtures of phosphorus compounds of formula (III) and phosphorus compounds of formula (IV) are also preferred flame retardants.

Examples of lubricants are hydrocarbons (e.g. paraffin oils, polyethylene waxes), alcohols (e.g. stearyl alcohol), carboxylic acids (e.g. lauric acid, palmitic acid, stearic acid), carboxylic acid amides (stearamide, ethylenediamine bisstearylamide), carboxylic acid esters (e.g. n-butyl stearate, stearyl stearate, glycerol monostearate, glycerol tristearate, pentaerythritol tetrastearate); preferred lubricants are carboxylic acid amides and carboxylic acid esters.

Examples of antistatic agents are cation-active compounds (e.g. quaternary ammonium, phosphonium or sulphonium salts), anion-active compounds (e.g. alkyl sulphonates, alkyl sulphates, alkyl phosphates, carboxylates in the form of alkali or alkaline earth salts), non-ionogenic compounds (e.g. polyethylene glycol esters, polyethylene glycol ethers, fatty acid esters, ethoxylated fatty amines); preferred antistatic agents are non-ionogenic compounds.

Examples of mould release agents are calcium stearate, zinc stearate, pentaerythritol tetrastearate; the preferred mould release agent is pentaerythritol tetrastearate.

For certain requirements relating to flameproofing, the polycarbonate/graft polymer moulding compositions may contain fluorinated polyolefins. These are of high molecular weight and possess glass transition temperatures of over −30° C., generally of over 100° C., fluorine contents, preferably of 65 to 76, especially of 70 to 76 wt. %, average particle diameters $d_{50}$ of 0.05 to 1000, preferably 0.08 to 20 μm. The fluorinated polyolefins generally have a density of 1.2 to 2.3 g/cm$^3$. Preferred fluorinated polyolefins are polytetrafluoroethylene, polyvinylidene fluoride, tetrafluoroethylene/hexafluoropropylene and ethylene/ tetrafluoroethylene copolymers. The fluorinated polyolefins are known (cf. "Vinyl and Related Polymer" by Schildknecht, John Wiley & Sons, Inc., New York, 1962, pages 484–494; "Fluorpolymers" by Wall, Wiley-Interscience, John Wiley & Sons, Inc., New York, vol. 13, 1970, pages 623–654; "Modern Plastics Encyclopedia", 1970–1971, vol. 47, No. 10 A, October 1970, McGraw-Hill Inc., New York, pages 134 and 774; "Modem Plastics Encyclopedia", 1975–1976, October 1975, vol. 52, No. 10 A, McGraw-Hill Inc., New York, pages 27, 28 and 472 and U.S. Pat. Nos. 3,671,487, 3,723,373 and 3,838,092).

In addition to the additives mentioned, the moulding compositions according to the invention may also contain stabilisers, pigments, fillers and reinforcing fillers. Preferred fillers are glass beads, mica, silicates, quartz, talcum, titanium dioxide or wollastonite. Preferred reinforcing fillers are glass or carbon fibres.

The moulding compositions according to the invention, containing components A) to D) and optionally other known additives such as stabilisers, dyes, pigments, fillers and reinforcing fillers and/or nucleating agents, are produced by blending the relevant components by a known method and melt-compounding or melt-extruding in conventional equipment such as internal mixers, extruders and twin-shaft screws at temperatures of 200° C. to 330° C.

The present invention therefore also relates to a process for the production of thermoplastic moulding compositions containing components A) to D) and optionally stabilisers, dyes, pigments, fillers and reinforcing fillers and/or nucleating agents, which is characterised in that the components A) to D), and optionally stabilisers, dyes, pigments, flow promoters, fillers and reinforcing fillers and/or nucleating agents, are melt-compounded or melt-extruded in conventional equipment at temperatures of 200 to 330° C.

The individual components may be blended by known means, both successively and simultaneously, and both at about 20° C. (room temperature) and at a higher temperature.

The moulding compositions of the present invention may be used to produce all types of mouldings. In particular, mouldings may be produced by injection moulding. Examples of mouldings that may be produced are: all types of housing parts, e.g. for domestic appliances such as juice presses, coffee machines, mixers, for office machinery, or covers for the construction sector and parts for the automotive sector. They are also used in the field of electrical engineering, as they have very good electrical properties.

The moulding compositions are particularly suitable for producing thin-walled mouldings (e.g. data systems technology housing parts), where standards relating to the notched impact strength and stress cracking resistance of the plastics used are particularly high. Another form of processing is the production of mouldings by blow moulding or by thermoforming from previously produced sheets or films.

EXAMPLES

Components Used

A1: polycarbonate based on bisphenol A with a relative solution viscosity of 1.26 to 1.28 measured in methylene chloride at 25° C. and a concentration of 0.5 g/100 ml.

A2: polycarbonate based on bisphenol A with a relative solution viscosity of 1.20, measured in methylene chloride at 25° C., and a concentration of 0.5 g/100 ml.

B1: styrene/acrylonitrile =72:28 copolymer with an average molecular weight $M_w \approx 81\,000$, produced by peroxidic bulk polymerisation with di-tert.-butyl peroxide at 150° C. Oligomer content: 0.50 wt. %

BV (comparison material): styrene/acrylonitrile =72:28 copolymer with an average molecular weight $M_w \approx 85\,000$, produced by thermal bulk polymerisation at 165° C. Oligomer content: 1.83 wt. %

C1: graft polymer obtained by emulsion polymerisation of 40 parts by weight of a monomer mixture of styrene and acrylonitrile (weight ratio: 73:27) in the presence of 60 parts by weight (calculated as solid) of a polybutadiene latex with an average particle size ($d_{50}$) of approx. 280 nm, coagulation with a magnesium sulphate/acetic acid mixture and drying of the polymer powder, C2: graft polymer obtained by emulsion polymerisation of 45 parts by weight of a monomer mixture of styrene and acrylonitrile (weight ratio: 72:28) in the presence of 55 parts by weight (calculated as solid) of a polybutadiene latex with an average particle size ($d_{50}$) of approx. 400 nm, coagulation with a magnesium sulphate/acetic acid mixture and drying of the polymer powder, D1: flame retardant: triphenyl phosphate, Disflamoll® TP from Bayer AG, Leverkusen, Germany D2: flame retardant: resorcinol oligophosphate, Fyrolflex® RDP from AKZO Nobel Chemicals GmbH, Düren, Germany D3: mould release agent: pentaerythritol tetrastearate Fluorinated polyolefin: the tetrafluoroethylene polymer is used as a coagulated mixture of a graft polymer emulsion as in C.2) in water and a tetrafluoroethylene polymer emulsion in water. The weight ratio of graft polymer C.2) to tetrafluoroethylene polymer in the mixture is 90 wt. % to 10 wt. %. The tetrafluoroethylene polymer emulsion has a solids content of 60 wt. % and the particle size is between 50 and 500 nm. The graft polymer emulsion has a solids content of 34 wt. % and an average latex particle size of 400 nm.

The components described above are homogeneously blended, in the quantities stated in Table 1, in an internal mixer at approx. 200° C. to 220° C. and then converted into granule form.

This material is processed under the following conditions using a special hot runner mould (see FIG. 1).

After 350 shots the disk is removed and the quantity of deposit is determined (see Table 1, penultimate column).

In addition, the weight loss of the moulding compositions is determined thermogravimetrically at 280° C. under the following conditions:

Method: dynamic thermogravimetry
Apparatus: Mettler TA 3000
Rate of heating: 10 K/min
Measuring range: 0–400° C.

Conditions: nitrogen as inert gas

Figure 2:
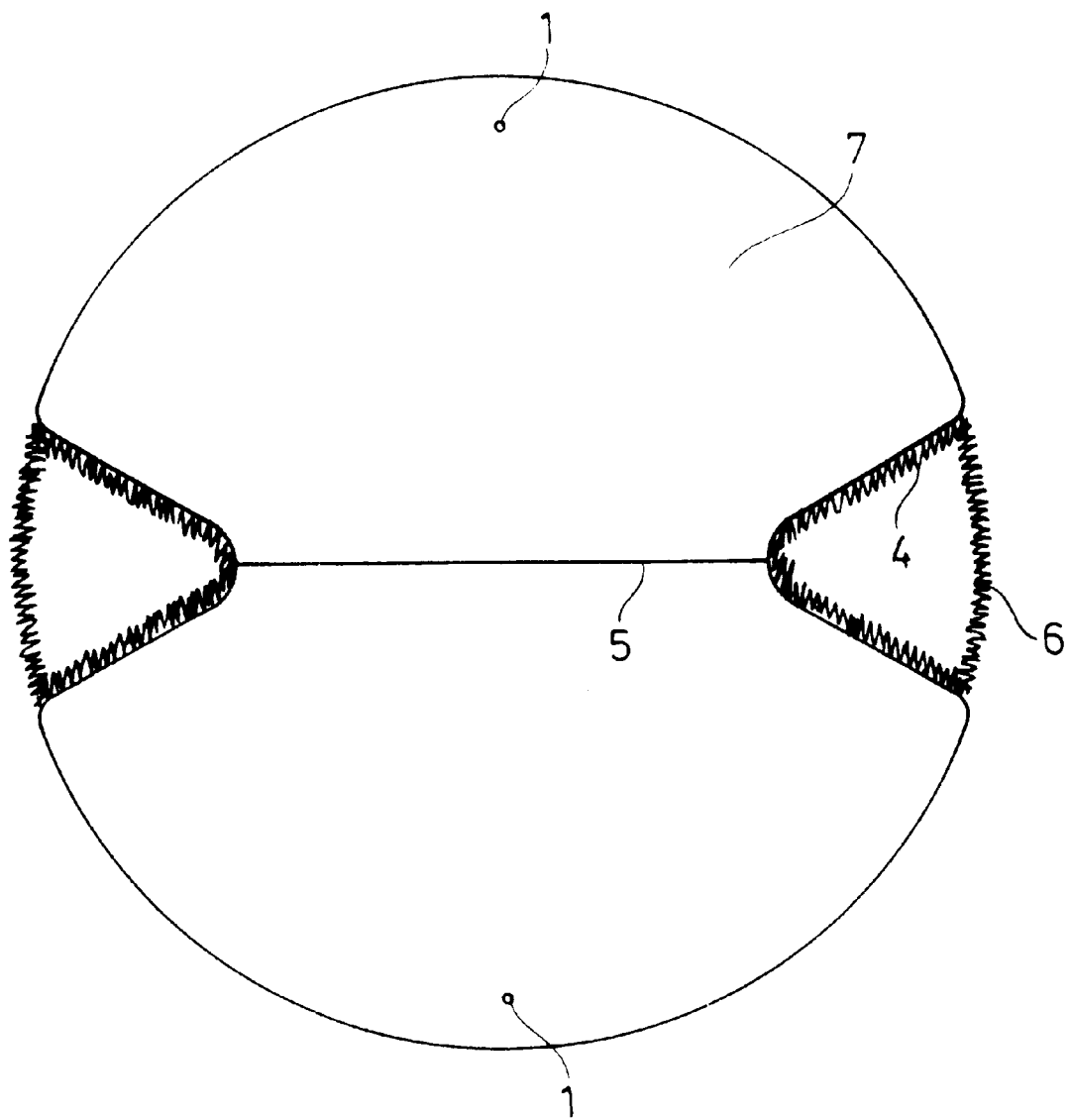

A special mould (FIG. 1) was used for measuring the deposits forming in the mould during injection moulding of these PC/ABS moulding compositions. In this mould, a circular disk 7 (diameter 118 mm, thickness 2 mm) was produced via two gates 1 (diameter 0.8 mm) by the injection moulding process in accordance with the processing conditions stated. When the hot melt (240° C.) flows into the cavity 2, deposits 4 of the volatile components form at the circular flow lines 5 of the moulding composition, which meet in the middle of the cavity 2. The injection moulding operation is stopped following the contact of these flow lines in such a way that a triangular space 6 remains for the evaluation of the deposit (FIG. 2). This operation corresponds to 80% of the total metering stroke. The quantities of deposit were measured in that the removable limiting disk 3 was removed from the mould after every 350 shots and its weight increase was determined (FIG. 2). Additional weight checking was carried out by removing the deposit by means of a razor blade.

It can be seen from the results that the polycarbonate-ABS moulding compositions according to the invention exhibit a clearly lower weight loss at 280° C. in the thermogravimetric analysis, and clearly reduced deposit formation, compared with the comparative examples.

| Processing conditions: | | |
|---|---|---|
| Injection moulder: | Klöckner-Ferromatik-FM 60, fully automatic | |
| | screw diameter | 25 mm |
| | clamping force | 600 kN |
| | max. shot weight | 45 g |
| | max. injection pressure | 3000 bar |
| Mould: | circular disk with 118 mm diameter, thickness 2 to 4 mm, preferably 2 mm, with hot runner (FIG. 1), 6 removable limiting disks, two-point gating (each 0.1 to 2 mm, preferably each 0.8 mm diameter) with flow line and pneumatic ejector, 1.5 mm wall thickness (variable), shot weight 20 g (sheet 15 g, sprue 5 g) | |
| Injection moulding parameters: | melt temperature | 240° C. |
| | mould temperature | 28° C. |
| | injection speed | 100 mm/s |
| | injection time | 0.5 s |
| | average dwell time | 143 s |
| | total cycle | 35.5 s |
| | (holding pressure time 12 s, cooling time 18 s, change-over time 1 s) | |

We claim:

1. Thermoplastic polycarbonate/graft polymer moulding compositions containing,
   A) 5 to 95 parts by weight of an aromatic polycarbonate,
   B) 1 to 50 parts by weight of at least one thermoplastic homopolymer, copolymer or terpolymer of styrene, α-methylstyrene, acrylontrile, N-substituted maleimide or mixtures thereof,
   C) 1 to 50 parts by weight of at least one graft polymer of
      C.1) 5 to 90 parts by weight of styrene, α-methylstyrene, acrylonitrile, N-substituted maleimide or mixtures thereof, on
      C.2) 95 to 10 parts by weight of a rubber with a glass transition temperature ≦0° C.
   and
   D) 1 to 25 parts by weight (per 100 parts by weight A+B+C) of at least one additive selected from the group of flame retardants, lubricants, antistatic agent, mould release agents or mixtures thereof,
   characterised in that the component B) is produced by bulk, solution or suspension polymerisation and has an oligomer content (dimers, trimers, tetramers) ≦1 wt. %, component C) is produced by emulsion polymerisation and the total oligomer content of the moulding compositions is ≦0.6 wt. %.

2. Thermoplastic polycarbonate-ABS moulding compositions according to claim 1, containing
   A) 10 to 90 parts by weight of an aromatic polycarbonate,
   B) 1 to 40 parts by weight of at least one thermoplastic homopolymer, copolymer or terpolymer of styrene, α-methylstyrene, acrylonitrile, N-substituted maleimide or mixtures thereof,
   C) 2 to 40 parts by weight of at least one graft polymer of
      C. 1) 30 to 80 parts by weight of styrene, α-methylstyrene, acrylonitrile, N-substituted maleimide or mixtures thereof, on
      C.2) 70 to 20 parts by weight of a rubber with a glass transition temperature ≦0° C. and
   D) 2 to 20 parts by weight (per 100 parts by weight A+B+C) of at least one additive selected from the group of flame retardants, lubricants, antistatic agent, mould release agents or mixtures thereof,
   characterised in that the component B) is produced by bulk, solution or suspension polymerisation and has an oligomer content (dimers, trimers, tetramers) ≦0.75 wt. %, component C) is produced by emul-

TABLE 1

Compositions of the moulding compositions and resulting deposit formation
(Data in parts by weight)

| Example | A1 | A2 | B1 | BV | C1 | C2 | D1 | D2 | D3 | fluorinated polyolefin | deposit quantity (mg) | weight loss at 280° C. (%) |
|---|---|---|---|---|---|---|---|---|---|---|---|---|
| Cp. 1 | 50 | 20 | — | 8 | — | 7.5 | — | 11 | — | 4 | 10 | 0.8 |
| 2 | 50 | 20 | 8 | — | — | 7.5 | — | 11 | — | 4 | 7 | 0.5 |
| Cp. 3 | 50 | 20 | — | 8 | — | 7.5 | 3 | 8 | — | 4 | 16 | 1.5 |
| 4 | 50 | 20 | 8 | — | — | 7.5 | 3 | 8 | — | 4 | 11 | 1.3 |
| Cp. 5 | 70 | — | — | 7 | 7.5 | — | 12 | — | 1 | 4 | 55 | 4.7 |
| 6 | 70 | — | 7 | — | 7.5 | — | 12 | — | 1 | 4 | 30 | 3.8 |
| Cp.7 | 60 | — | — | 20 | 20 | — | — | — | 1 | — | 10 | 1.0 |
| 8 | 60 | — | 20 | — | 20 | — | — | — | 1 | — | 6 | 0.8 | sion polymerisation and the total oligomer content of the moulding compositions is $\leq 0.4$ wt. %.

3. Thermoplastic moulding compositions according to claim 1, characterised in that copolymers of styrene, α-methylstyrene, acrylonitrile, N-substituted maleimide or mixtures thereof are used as component B).

4. Moulding compositions according to claim 1, characterised in that the rubber is a diene rubber, acrylate rubber, silicone rubber or ethylene-propylene-diene rubber.

5. Thermoplastic moulding composition according to claim 1 containing as D) a halogen-free flame retardant.

6. Thermoplastic moulding composition according to claim 1 containing as flame retardant D) phosphorus compounds of formula (III)

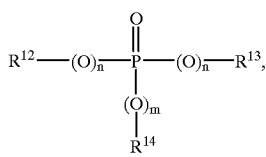
(III)

wherein $R^{12}$, $R^{13}$ and $R^{14}$, independently of one another, are $C_1$–$C_8$ alkyl or optionally halogenated $C_5$ or $C_6$ cycloalkyl or optionally alkylated or aralkylated $C_6$–$C_{30}$ aryl, and n and m, independently of one another, are 0 or 1.

7. Moulding compositions according to claim 1 containing as D) phosphorus compounds of formula (IV)

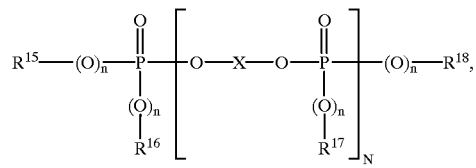
(IV)

wherein $R^{15}$, $R^{16}$, $R^{17}$, $R^{18}$, independently of one another, denote $C_1$–$C_8$ alkyl, $C_5$–$C_6$ cycloalkyl, $C_6$–$C_{10}$ aryl or $C_7$–$C_{12}$ aralkyl, n denotes, independently, 0 or 1

N denotes a number from 1 to 5 and, in the case of mixtures, an average value between 1 and 5

X denotes a mono- or polynuclear aromatic group with 6 to 30 C atoms.

8. Moulding compositions according to claim 6, containing triphenyl phosphate as component D).

9. Moulding compositions according to claim 6 containing mixtures of phosphorus compounds of formula (III) and of phosphorus compounds of formula (IV) as component D).

10. A process of injection moulding, comprising injection moulding the composition of claim 1.

11. A process of moulding, comprising moulding the composition of claim 1 to produce a high-gloss moulding.

* * * * *